(12) United States Patent
Earls

(10) Patent No.: US 10,736,298 B2
(45) Date of Patent: Aug. 11, 2020

(54) BARRIER COMPONENTS FOR ANIMAL STALLS

(71) Applicant: Michael Earls, Athenry (IE)

(72) Inventor: Michael Earls, Athenry (IE)

(73) Assignee: Michael Earls, Athenry (IE)

( * ) Notice: Subject to any disclaimer, the term of this patent is extended or adjusted under 35 U.S.C. 154(b) by 536 days.

(21) Appl. No.: 14/568,504

(22) Filed: Dec. 12, 2014

(65) Prior Publication Data

US 2015/0164037 A1    Jun. 18, 2015

(30) Foreign Application Priority Data

Dec. 13, 2013 (GB) .................................. 1322068.6

(51) Int. Cl.
    *A01K 1/00*      (2006.01)

(52) U.S. Cl.
    CPC .................. *A01K 1/0011* (2013.01)

(58) Field of Classification Search
    CPC ............ F16L 33/00; F16L 33/28; F16L 31/00
    USPC .................. 256/65.15, 66; 285/331
    See application file for complete search history.

(56) References Cited

U.S. PATENT DOCUMENTS

| | | | | |
|---|---|---|---|---|
| 2,447,697 A * | 8/1948 | Gotschall | ................ | F16L 33/00 285/244 |
| 2,449,265 A * | 9/1948 | Williams | ................. | F01P 11/04 138/118 |
| 3,473,833 A * | 10/1969 | Bremer | ................. | B29C 65/561 285/285.1 |
| 3,520,561 A * | 7/1970 | Rininger | ............... | E21B 17/042 138/109 |
| 4,173,989 A * | 11/1979 | Prest | ....................... | F16L 43/02 138/109 |
| 4,220,316 A * | 9/1980 | Naka | .................... | E04F 11/1836 256/1 |
| 4,602,766 A * | 7/1986 | Naka | ..................... | E04F 11/184 256/59 |
| 4,646,490 A * | 3/1987 | Naka | ..................... | E04F 11/184 256/59 |

(Continued)

FOREIGN PATENT DOCUMENTS

| | | | | |
|---|---|---|---|---|
| EP | 2497356 A1 | 9/2012 | | |
| FR | 2781331 B1 * | 8/2000 | ........... | A01K 1/0011 |

(Continued)

OTHER PUBLICATIONS

"Green Cubicle with Rubber Loop" downloadable at http://web.archive.org/web/20140918042259 available at least as of Nov. 5, 2015.

(Continued)

*Primary Examiner* — Daniel J Wiley
(74) *Attorney, Agent, or Firm* — Warner Norcross + Judd LLP

(57) ABSTRACT

A barrier component includes a curved, elongated body member of elastomeric material such as rubber. This body member has first and second end sections each adapted for engagement within a respective hollow pipe. Together the two hollow pipes and the barrier component provide a stall divider when mounted on a suitable set of brackets, poles or supports at the head end of a stall. The component has a collar formation at each end which defines an annular recess for receiving a hollow pipe end and shielding the end of the pipe from the animal.

13 Claims, 4 Drawing Sheets

(56) References Cited

U.S. PATENT DOCUMENTS

| | | | | |
|---|---|---|---|---|
| 4,899,989 | A | * | 2/1990 | Kitson ................ E04F 11/1863 |
| | | | | 182/133 |
| 5,333,922 | A | * | 8/1994 | Jones .................... E05O 19/004 |
| | | | | 292/339 |
| 5,975,026 | A | * | 11/1999 | Rudolph .............. A01K 1/0011 |
| | | | | 119/523 |
| 7,520,492 | B1 | * | 4/2009 | Lai ....................... A47K 17/022 |
| | | | | 256/65.05 |
| 2002/0011218 | A1 | | 1/2002 | Rudolph |

FOREIGN PATENT DOCUMENTS

| | | | |
|---|---|---|---|
| GB | 1380414 A | 1/1975 | |
| WO | WO 2012164549 A1 * | 12/2012 | ........... A01K 1/0011 |

OTHER PUBLICATIONS

European Search Report for EP 14197508, the European counterpart to U.S. Appl. No. 14/568,504.

* cited by examiner

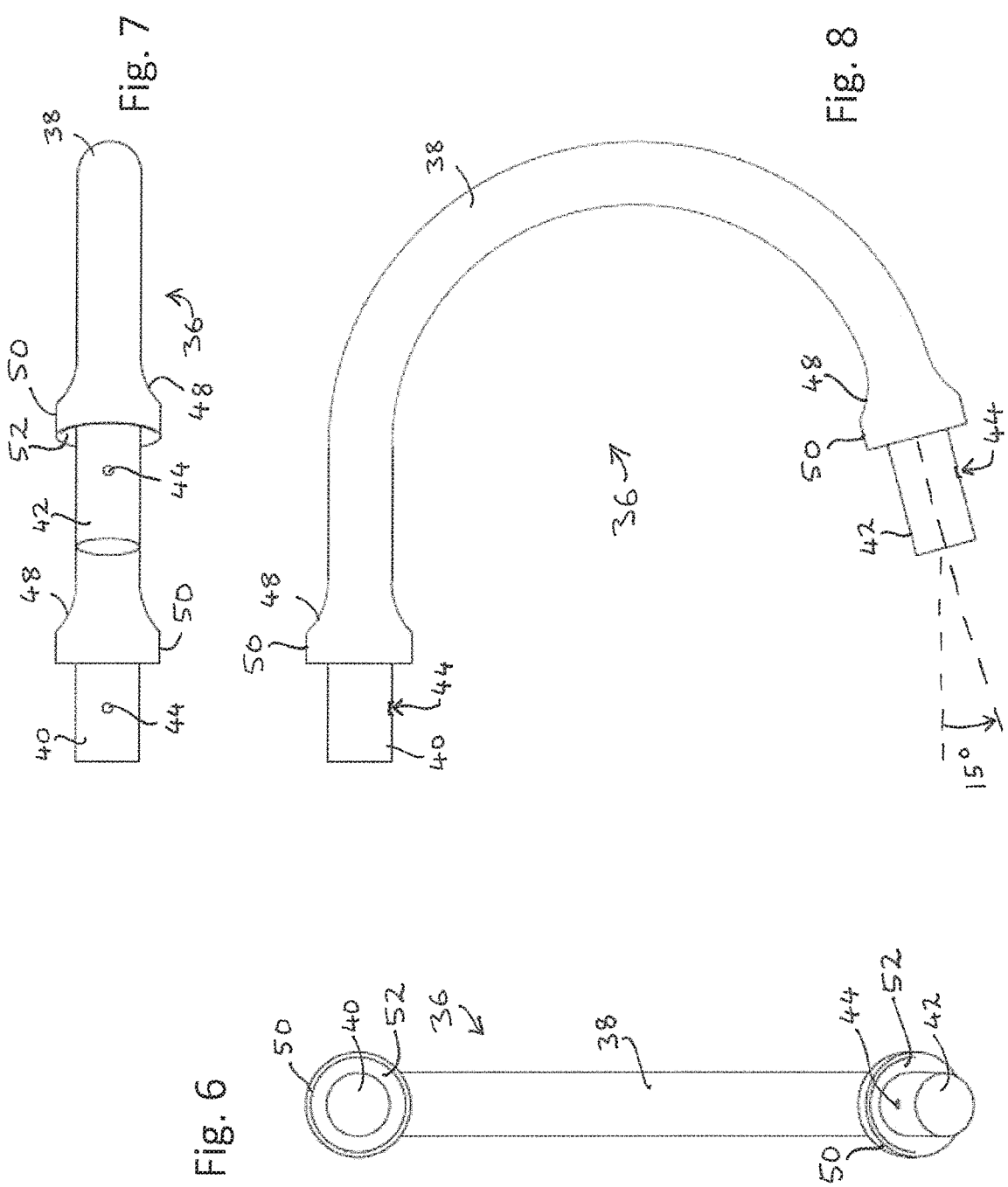

BARRIER COMPONENTS FOR ANIMAL STALLS

TECHNICAL FIELD

This invention relates to stalls or cubicles for animals.

BACKGROUND ART

Farm animals are frequently accommodated indoors using stalls (also referred to as cubicles or pens; the term "stalls" will be used herein). One common design of stall has a common head barrier or wall with parallel dividers projecting out to define individual spaces for animals between a pair of adjacent dividers.

Typical steel stall dividers are a basic U shape made of one piece of steel tubing bent to make the U shape. The ends of the "U" are mounted to the head end barrier (i.e. with the "U" lying on its side) and with the bottom of the "U" projecting outwards. These dividers cause injuries to the animals.

One solution is to replace the stainless steel divider with a pair of flexible plastic pipes, replacing the upper and lower rails of the steel "U" shape. Easyfix Limited, of Ballinasloe, Ireland supply such a product employing hollow polypropylene random (PP-R) co-polymer pipes, which provide a safe replacement for the conventional steel stall dividers and eliminate possible injuries to animals.

One problem encountered with this solution was that because the PP-R pipe stall system uses two open ended pipes, when young animals or animals, which were not used to a stall system, first entered the stall there was a chance of them being able to turn around in the stall and end up facing the wrong way.

It is not practical to bend an extruded PP-R pipe into a U-shape as the pipe has to be heated evenly all the way through its 12.5 mm wall thickness. This would require a huge oven capable of taking several 4 meter lengths of pipe and then bending them in a press big enough to press them into shape and hold that shape while they cooled. Such a process would be cost prohibitive.

A further drawback of recreating the steel U-shape with PP-R material is that the resultant product loses the flexibility inherent in having a pair of pipes freely projecting from a single mounting point. If created in a U shape, the PP-R pipe would be too rigid a product.

DISCLOSURE OF THE INVENTION

In a first aspect there is provided a barrier component for an animal stall, comprising:

a curved, elongated body member of elastomeric material, the body having first and second end sections;

the first end and the second end sections each being adapted for engagement within a hollow pipe; and a collar formation adjacent the first end or the second end which defines an annular recess for receiving a hollow pipe end.

Creating a barrier component, for fitting to a pair of hollow pipe ends, from an elastomeric material, provides a number of benefits.

A U-shaped barrier can be created from a pair of lightweight polymer (e.g. PP-R) pipes which are mounted to a head end mounting such as a head-end barrier or a wall bracket, and the barrier component of the invention, resulting in a divider which is significantly less rigid than either a steel U section or a U shaped barrier formed of PP-R pipe (or similar polymers).

The component allows the two existing pipes to flex almost independently of one another and it also brought an added safety factor for the animals in that there is absolutely no danger of the animals getting bruised when entering the stall, or even if they brush past the outside of the stall while using the access passageway.

The component also prevents injury to the animals in the stall as it will stretch if an animal is panicked while in the stall. Additionally it is practical and cost effective to manufacture and can be attached relatively simply using bolts or other fasteners that can be simply passed through the plastic pipe and the ends of the component received in the pipe.

The collar provides an annular recess which accommodates the end of the pipes and thereby protects the animal when entering the stall from injury against the edge of the pipe ends, and also prevents animals from using the pipe end as a scratching post. Furthermore, by accommodating the pipe end within the recess, dirt is prevented from entering the pipe.

The collar serves the further function of continuing to protect the pipe end even if the component is severely stretched.

Preferably, said curved, elongated body subtends an angle of between 90 and 220 degrees, more preferably 140 and 180 degrees, even more preferably between 150 and 175 degrees.

Preferably, said body is generally cylindrical along its length and has a first diameter in a middle section thereof, the first and second ends having a second diameter which is less than the first diameter.

The middle section preferably occupies the major part of the length of the component.

Preferably, the collar comprises a flared formation which increases in diameter towards the end section to which it is adjacent.

Preferably, the flared formation increases in diameter from the first diameter where it merges with the middle section to a third diameter greater than the first diameter, the increase in diameter being continuous rather than abrupt.

Preferably, the collar further comprises an annular skirt projecting axially from the flared section towards the end section to which the collar is adjacent, the skirt and the end section defining between them said annular recess.

Most preferably, two of said collars are provided, one adjacent each end section. The end sections are preferably provided with a through hole to receive a locking member. In a preferred embodiment, the elastomeric material is vulcanised moulded rubber.

There is also provided a barrier assembly for an animal stall comprising the barrier component described above, and first and second pipes each having a hollow free end, wherein the free ends of the first and second pipes receive a respective one of the first and second ends of the barrier component, such that the curved elongated body member connects the first and second pipes.

There is further provided an animal stall assembly comprising a plurality of said barrier assemblies mounted parallel to one another along a central barrier such that the barrier assemblies are spaced apart from one another and each adjacent pair of barrier assemblies defines a respective animal stall, the first and second pipes of each barrier assembly being generally mounted one above the other and the barrier component of each barrier assembly being disposed at an outer end of the stall away from the central barrier.

In a further, independent aspect of the invention, there is provided a stall divider for animal stalls, comprising:

first and second pipes each having a head end adapted for mounting on a fixed head-end barrier, whereby in use said pipes extend from said head end to a free end, the pipes lying within and defining a substantially vertical plane which separates a pair of neighbouring stalls; and a connecting member comprising a curved length of flexible material having first and second ends, the first and second ends being adapted for mounting in the free ends of the first and second pipes, respectively.

Preferably, said first and second pipes are made of PP-R (polypropylene random copolymer).

The connecting member preferably comprises a solid flexible tube extending in a curved fashion from the free end of the first pipe to the free end of the second pipe.

Preferably, the connecting member is secured to the free ends by being inserted into a hollow terminal portion at the free end of each pipe, and being secured by a bolt extending through the free end and the connecting member.

BRIEF DESCRIPTION OF THE DRAWINGS

The invention will be further illustrated by the following description of embodiments thereof, given by way of example only with reference to the accompanying drawings, in which:

FIG. 6 is a rear elevation of the barrier component of FIG. 3;

FIG. 7 is a plan view from below of the barrier component of FIG. 3; and FIG. 8 is a side elevation of the barrier component of FIG. 3.

In FIG. 1 there is indicated, generally at 10, an animal house layout containing an animal stall assembly 12 with a plurality of animal stalls 14 arranged in two rows 16, 18.

Figure 1:
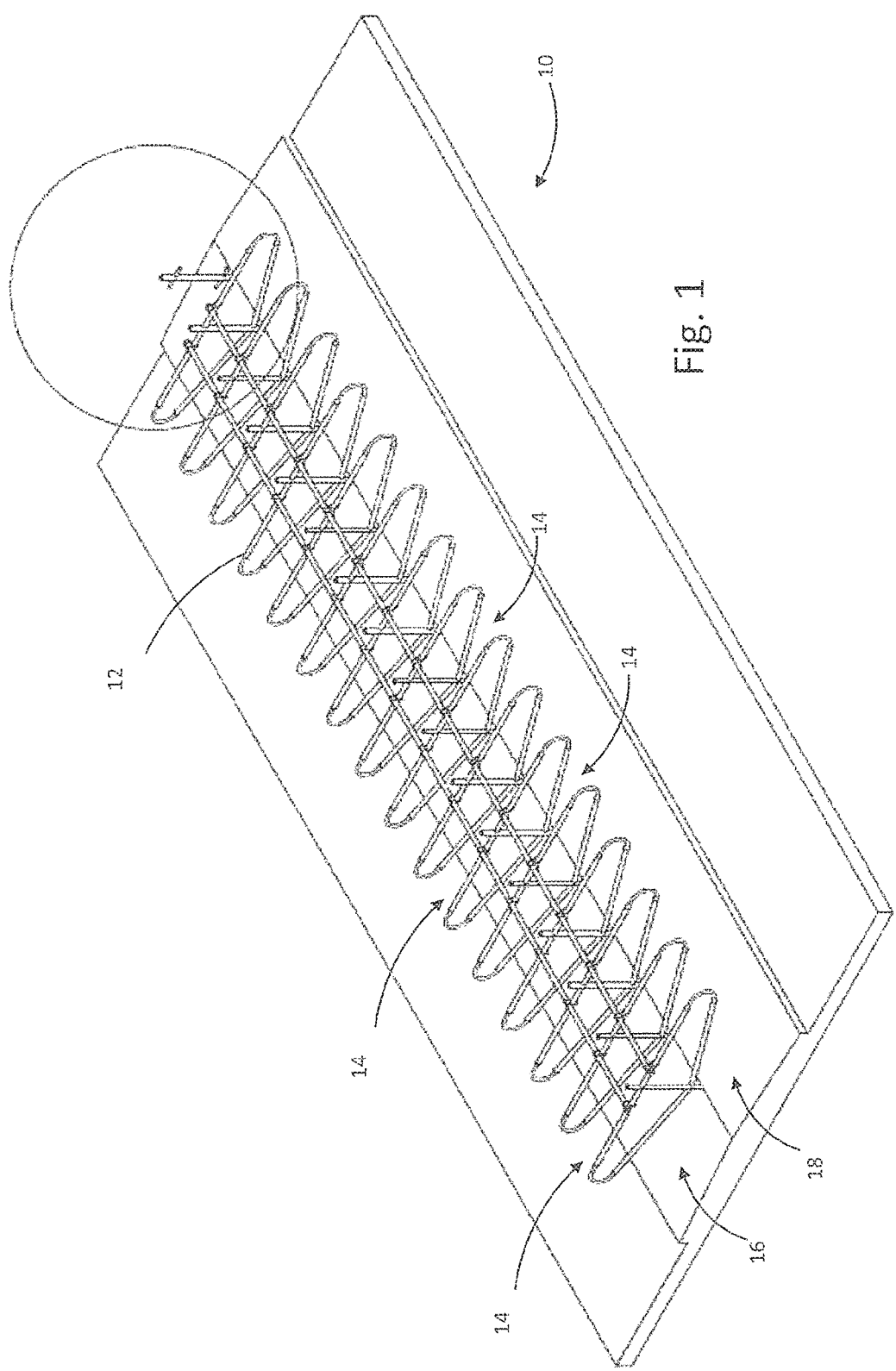
FIG. 1 is a perspective view of a layout of an animal house containing a set of stalls.
Figure 2:
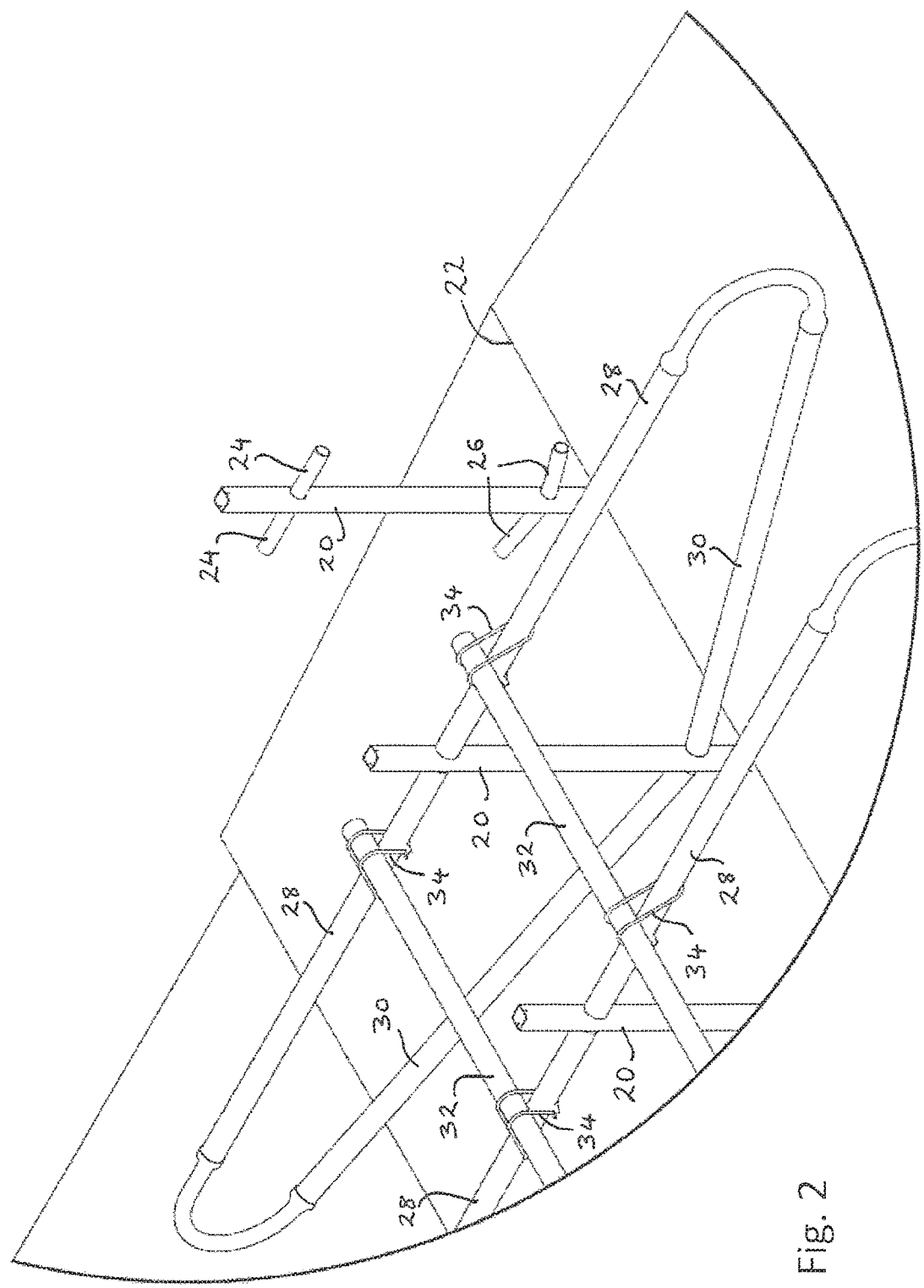
FIG. 2 is a detail of FIG. 1.

Referring additionally to FIG. 2, a detail of the FIG. 1 layout is shown, including a series of cubicle posts 20 mounted along a centre line 22 of the animal house. The endmost post 20 is shown without any barrier or stall divider, and it can be seen that the post is provided with a pair of upper mounting posts 24 and a pair of lower mounting posts 26. As seen with the next adjacent post 20, the upper mounting posts (not visible) are used to each mount a respective upper barrier pole 28 which extend horizontally outward from one another, while the lower mounting posts (not visible) are used to each mount a respective lower barrier pole 30 which extend outward from one another in the same vertical plane as the upper posts 28, but inclined upwardly at an angle of 15 degrees.

Lengthwise head-end rails, known as neckrails 32, are tied to the top of the upper barrier poles 28 by a series of steel neckrail clamp brackets 34, such that the pair of neckrails 32 run in parallel along the head-end of each row 16, 18 of stalls 14 (FIG. 1). (As used herein the term "head-end" refers to the part of the stall nearest to the centre line 22, as opposed to the "open end" into which the animal enters a stall.)

Connecting the upper barrier pole 28 and lower barrier pole 30 of each stall divider or barrier assembly is a generally C-shaped barrier component 36, with the barrier assembly comprising a connected pair of poles 28, 30 and the component 36. It can be seen that the ends of the "C" shape are mated with the poles 28, 30 at the open end of the stalls. The poles are either hollow along their length or hollow at the end section to receive an end section of the component 36, which will now be described in greater detail.

Figure 5:
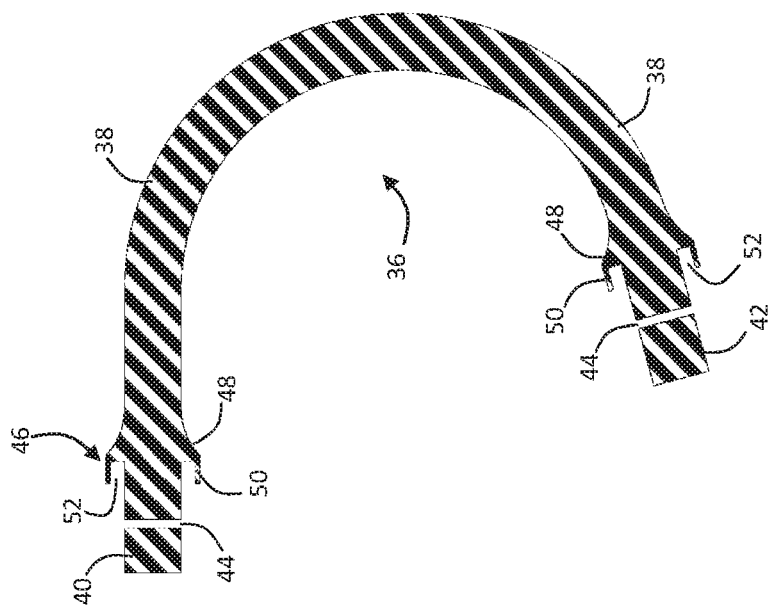
FIG. 5 is a sectional elevation of the barrier component of FIG. 3, along the line V-V in FIG. 4.
Figure 4:
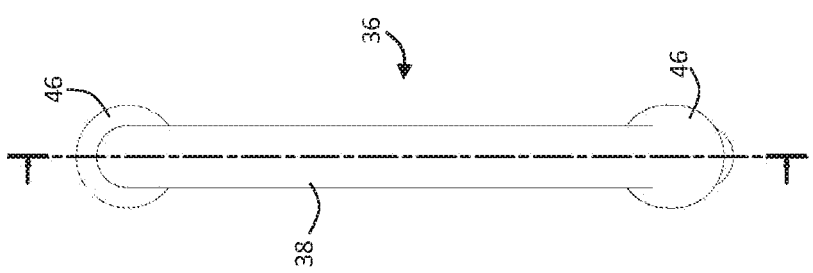
FIG. 4 is a front elevation of the barrier component of FIG. 3.
Figure 3:
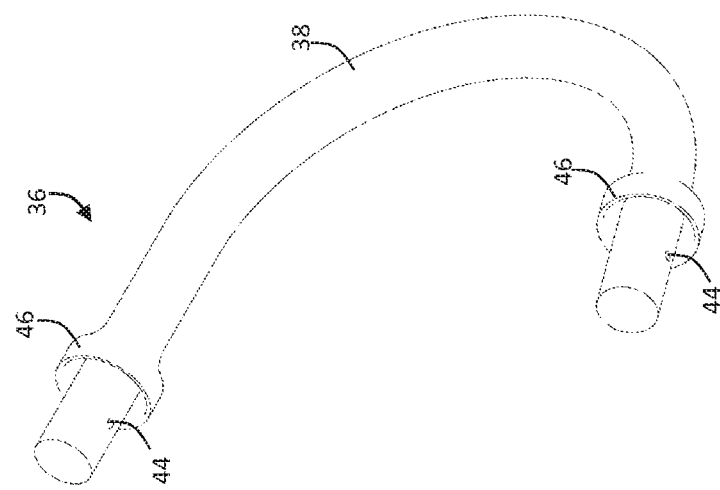
FIG. 3 is a perspective view of a barrier component of one animal stall divider assembly.

Referring to FIG. 3-8, the barrier component 36 is shown in perspective (FIG. 3), from the front, rear, below and one side (FIGS. 4, 6, 7 and 8, respectively), and in FIG. 5 in cross section taken along the line V-V in FIG. 4.

The component 36 comprises a curved, elongated body member made of vulcanised, moulded rubber (though other flexible elastomers can be used). The body member has a middle section 38 which is curved into an arc and which occupies the major part of the length of the generally cylindrical curved body 36. The arc subtends an angle of 165 degrees, such that its upper end 40 is offset from its lower end 42 by an angle of 15 degrees, as seen in FIG. 8, matching the offset of the poles 28, 30.

Each of the end sections ends 40, 42 is provided with a through hole 44 allowing it to be secured in place within its respective pole 28, 30 using a bolt (not shown) which passes through a corresponding pair of holes (not shown) in the pole. The diameter of the end sections 40, 42 is dimensioned to make a snug fit with the interior diameter of the hollow ends of the poles. The diameter of the middle section is approximately the same as the outside diameter of the poles.

Between the middle section 38 (having a first diameter) and the each of the ends 40, 42 (having a second diameter less than the first diameter), is a collar formation 46 which has a flared formation 48 (FIG. 5) that increases in diameter towards the end section to which it is adjacent from the first diameter where it merges with the middle section to a third diameter greater than the first and second diameters. An annular skirt 50 projects axially from the flared formation 48 towards the end section 40,42 to which the collar is adjacent. The skirt 50 and the end section 40, 42 define between them an annular recess 52 which is dimensioned to receive the end of the pipe or pole 28,30 onto which the component is mounted.

When the component 36 is mounted on a pair of poles 28, 30, the collar shields the pole ends and provides a continuous rather than abrupt transition. The resulting assembly is flexible and designed to avoid injuring the animals, while overcoming the disadvantages of known prior art systems as described earlier.

The invention is not limited to the embodiments described which can be modified without departing from the scope of the claimed invention.

The invention claimed is:

1. A barrier component for an animal stall, comprising:
a curved, elongated body member of elastomeric material having a longitudinal axis, the body member being curved along the longitudinal axis and having a solid cross section and first and second end sections spaced along the longitudinal axis;
the first end and the second end sections each being adapted for engagement within a hollow pipe; and
a collar formation adjacent the first end or the second end, the collar formation comprising a flared formation which increases in diameter towards the end section to which it is adjacent and further comprising an annular skirt projecting axially from the flared formation towards the end section to which the collar is adjacent, the skirt and the end section defining between them an annular recess for receiving a hollow pipe end, wherein the body member, first and second end section and the collar formation form a unitary body of elastomeric material.

2. The barrier component of claim 1, wherein said curved, elongated body member subtends an angle of between 90 and 220 degrees.

3. The barrier component of claim 1, wherein said body member is cylindrical along its length along the longitudinal axis and has a first diameter in a middle section thereof, the first and second ends sections having a second diameter which is less than the first diameter.

4. The barrier component of claim 1, wherein the flared formation increases in diameter from the first diameter where it merges with the middle section to a third diameter greater than the first diameter, the increase in diameter being continuous.

5. The barrier component of claim 1, wherein two of said collars are provided, one adjacent each end section.

6. The barrier component of claim 1, wherein the end sections are provided with a through hole to receive a locking member.

7. The barrier component of claim 1, wherein the elastomeric material is vulcanised moulded rubber.

8. A barrier assembly for an animal stall comprising the barrier component of claim 1, said barrier assembly further comprising first and second pipes each having a hollow free end, wherein the free ends of the first and second pipes receive a respective one of the first and second ends of the barrier component, such that the curved elongated body member connects the first and second pipes.

9. An animal stall assembly comprising a plurality of barrier assemblies according to claim 8 mounted parallel to one another along a central barrier such that the barrier assemblies are spaced apart from one another and each adjacent pair of barrier assemblies defines a respective animal stall, the first and second pipes of each barrier assembly being generally mounted one above the other and the barrier component of each barrier assembly being disposed at an outer end of the stall away from the central barrier.

10. A stall divider for animal stalls, comprising:
first and second hollow pipes each having a head end adapted for mounting on a fixed head-end barrier, whereby in use said pipes extend from said head end to a free end, the pipes lying within and defining a vertical plane which separates a pair of neighbouring stalls; and
the first end and the second end sections of the curved, elongated body member of the barrier component of claim 1 being mounted in the free ends of the first and second hollow pipes, respectively.

11. A stall divider according to claim 10, wherein said first and second pipes are made of PP-R (polypropylene random copolymer).

12. A stall divider according to claim 10, wherein said curved, elongated body member comprises a solid flexible cylindrical member extending in a curved fashion from the free end of the first pipe to the free end of the second pipe.

13. A stall divider according to claim 10 wherein said curved, elongated body member is secured to the free ends by being inserted into a hollow terminal portion at the free end of each of said first and second hollow pipes, and is secured by a bolt extending through the respective free end and the curved, elongated body member.

* * * * *

UNITED STATES PATENT AND TRADEMARK OFFICE
CERTIFICATE OF CORRECTION

| | |
|---|---|
| PATENT NO. | : 10,736,298 B2 |
| APPLICATION NO. | : 14/568504 |
| DATED | : August 11, 2020 |
| INVENTOR(S) | : Michael Earls |

It is certified that error appears in the above-identified patent and that said Letters Patent is hereby corrected as shown below:

In the Claims

Column 5, Claim 3, Line 16:
"first and second ends sections having a second diameter"

Should be:
--first and second end sections having a second diameter--

Signed and Sealed this
Twenty-eighth Day of February, 2023

Katherine Kelly Vidal
*Director of the United States Patent and Trademark Office*